US012768474B2

(12) United States Patent
Förg

(10) Patent No.: US 12,768,474 B2
(45) Date of Patent: Oct. 20, 2026

(54) FIRE PROTECTION COLLAR

(71) Applicant: Hilti Aktiengesellschaft, Schaan (LI)

(72) Inventor: Christian Förg, Buchloe (DE)

(73) Assignee: Hilti Aktiengesellschaft, Schaan (LI)

( * ) Notice: Subject to any disclaimer, the term of this patent is extended or adjusted under 35 U.S.C. 154(b) by 44 days.

(21) Appl. No.: 18/873,028

(22) PCT Filed: May 31, 2023

(86) PCT No.: PCT/EP2023/064522
§ 371 (c)(1),
(2) Date: Dec. 9, 2024

(87) PCT Pub. No.: WO2023/241914
PCT Pub. Date: Dec. 21, 2023

(65) Prior Publication Data

US 2025/0354630 A1 Nov. 20, 2025

(30) Foreign Application Priority Data

Jun. 14, 2022 (EP) .................................... 22178804

(51) Int. Cl.
*A62C 2/06* (2006.01)
*F16L 5/04* (2006.01)

(52) U.S. Cl.
CPC ................ *F16L 5/04* (2013.01); *A62C 2/065* (2013.01)

(58) Field of Classification Search
CPC .................................. F16L 5/04; A62C 2/065
See application file for complete search history.

(56) References Cited

U.S. PATENT DOCUMENTS

| | | | | |
|---|---|---|---|---|
| 5,103,609 | A | 4/1992 | Thoreson et al. | |
| 5,634,304 | A | 6/1997 | Sakno | |
| 9,638,225 | B2 | 5/2017 | Koegler et al. | |
| 10,975,989 | B2 * | 4/2021 | Albers | H02G 3/0412 |
| 2007/0151183 | A1 * | 7/2007 | Stahl, Sr. | F16L 5/04 52/317 |

(Continued)

FOREIGN PATENT DOCUMENTS

| | | |
|---|---|---|
| DE | 198 52 120 | 12/2002 |
| EP | 3 477 174 | 7/2021 |

OTHER PUBLICATIONS

International Search Report received for PCT Application No. PCT/EP2023/064522, mailed on Aug. 10, 2023, 6 pages with English translation.

(Continued)

*Primary Examiner* — David M Upchurch
(74) *Attorney, Agent, or Firm* — Grüneberg Global IP, PLLC

(57) ABSTRACT

A fire protection collar for a pipe has a belt package at least in part having an intumescent material, a first and a second closure element. The first closure element is arranged at a first end of the belt package and the second closure element is arranged at a second end of the belt package opposite the first end. The first closure element and the second closure element can be fastened together in such a way that the belt package forms a substantially closed contour. The belt package has a package length between the first end and the second end of the belt package and is exposed at least in part along the package length.

12 Claims, 6 Drawing Sheets

(56) References Cited

U.S. PATENT DOCUMENTS

| | | | | |
|---|---|---|---|---|
| 2015/0211557 | A1* | 7/2015 | Koegler | F16B 2/22<br>24/484 |
| 2019/0120409 | A1* | 4/2019 | Monden | H02G 3/0412 |

OTHER PUBLICATIONS

Written Opinion received for PCT Application No. PCT/EP2023/064522, mailed on Aug. 10, 2023, 10 pages with English translation.

* cited by examiner

FIRE PROTECTION COLLAR

CROSS-REFERENCE TO RELATED APPLICATIONS

This application is a National Stage entry under § 371 of International Application No. PCT/EP2023/064522, filed on May 31, 2023, and which claims the benefit of priority to European Patent Application No. 22178804.5, filed on Jun. 14, 2022.

BACKGROUND OF THE INVENTION

Field of the Invention

The present invention relates to a fire protection collar for a pipe.

Description of Related Art

Fire protection collars are used to provide compartmentalization solutions for pipes, in particular plastic pipes, that pass through walls. The aim is to close off the wall or ceiling opening through which the pipe passes in the event of a fire once the melted or burned pipe no longer provides a seal. For this purpose, fire protection collars have an intumescent material. Intumescent materials have the property of expanding above a certain threshold temperature. As it expands, the material foams up and then carbonizes, thereby providing a heat-insulating, resistant layer. In this way, the wall or ceiling opening can be reliably closed off in the event of a fire in order to prevent the flames from spreading through the wall or ceiling opening and into adjacent spaces.

Since application cases differ and generally plastic pipes of different diameters are used, continuous collars are known, for example. Continuous collars have a strip having intumescent material, which in the installation case is cut to size on site by the user depending on the diameter of the plastic pipe. On the one hand, this allows comparatively low manufacturing costs for the manufacturer because he only needs to produce an “endless belt”. On the other hand, continuous collars require a relatively high amount of work effort on the part of the user in order to obtain a suitable collar as a function of the diameter of the plastic pipe in question. The effort is additionally increased if the manufacturer does not provide a suitable holding structure, but rather the holding structure, which is arranged on the outside with respect to the intumescent material in the application, is realized by a metal strip that must likewise be cut to size by the user. Then the user must thus cut two tailored sections as a function of the diameter of the plastic pipe. This often leads to a relatively large amount of undesired waste, and also to high costs, for example in the case of unskilled users.

As an alternative to continuous collars, prefabricated collars are known, which have two collar elements that are placed around the pipe and fastened to one another, each having a receiving space for the intumescent material. The collar elements can have holding structures by means of which the collar elements can be fixed to the wall. However, such collar elements are typically to be manufactured using punching and bending tools, whereby the manufacturer of the collar must have different punching and bending tools for different pipe diameters. For the manufacturer, the payback period for these tools is often very long, especially in the case of infrequently installed pipe sizes. The comparatively small quantities that can be sold on the market therefore often do not justify the investment in such specific and thus cost-intensive tools.

In the case of prefabricated collars, a further complication is that the intumescent layer is generally arranged in multiple layers in the respective housing of the collar element. For the manufacturer, the increasing radius, measured from the center of the plastic pipe, means that the different layers of the intumescent material must be of different lengths. Nevertheless, the individual layers must be joined together to form a package so that they can be placed in the receiving space, which typically requires a relatively large amount of manual labor and the use of additional materials, such as adhesive tapes. This further increases the manufacturing effort.

SUMMARY OF THE INVENTION

The invention is therefore based on the object of providing a fire protection collar by means of which the disadvantages of known fire protection collars can be eliminated or at least reduced. In particular, the respective wall or ceiling opening should be reliably closed if necessary. The fire protection collar according to the invention should preferably be associated with reduced effort for the user and the manufacturer. It is particularly preferable that the user of the fire protection collar incurs no additional manufacturing effort, with the exception of the usual installation effort.

This object is achieved by means of the subject-matter of the description herein. Advantageous embodiments are set forth in the following description, each of which can represent aspects of the invention per se or in (sub) combination.

DETAILED DESCRIPTION OF THE INVENTION

Figure 1:
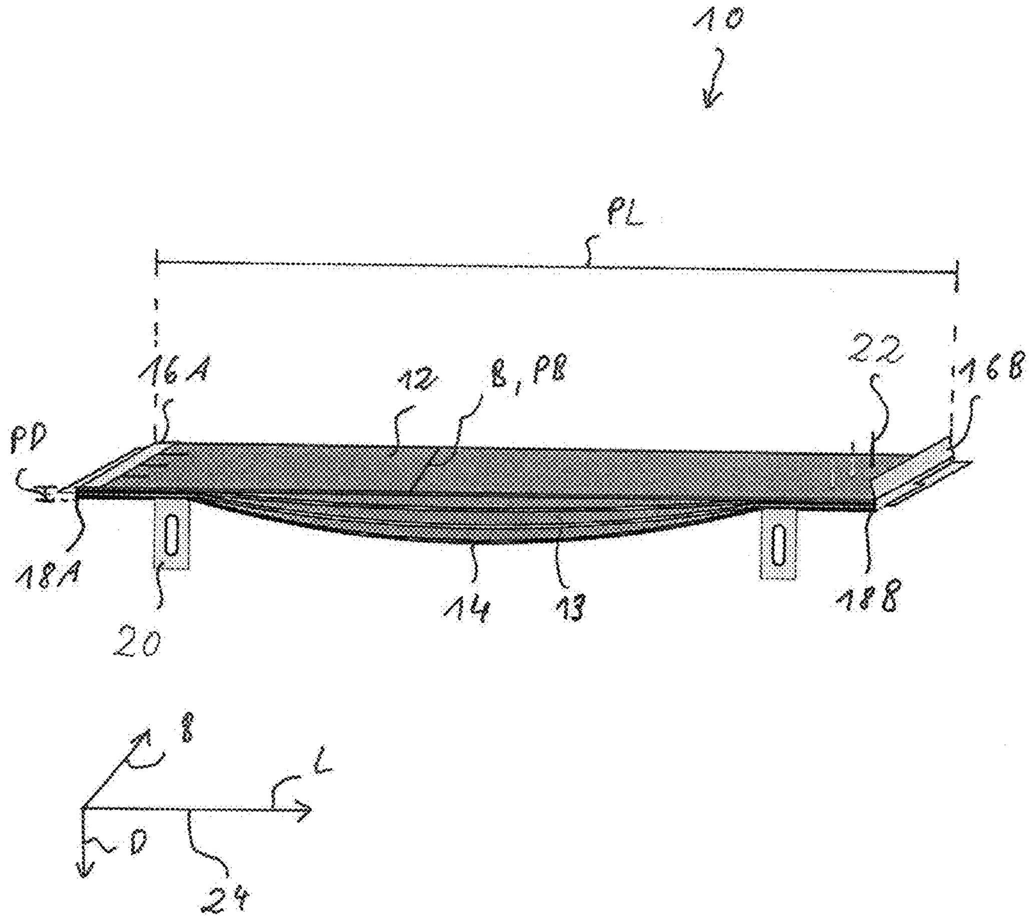
FIG. 1 is a simplified schematic representation of a fire protection collar according to one embodiment.

According to one aspect, a fire protection collar for a pipe is provided. The fire protection collar comprises a belt package that comprises at least in part an intumescent material. Furthermore, the fire protection collar comprises a first and a second closure element. The first closure element is arranged at a first end of the belt package and the second closure element is arranged at a second end of the belt package opposite the first end. The first closure element and the second closure element can be fastened together in such a way that the belt package forms an essentially closed contour. The belt package has a package length between the first end and the second end of the belt package and is exposed at least in part along the package length.

The fire protection collar designed in this way advantageously allows a low manufacturing effort for the manufacturer and does not require any additional effort from the installer or user, with the exception of the usual installation operations. By means of the closure elements arranged at the opposite ends of the belt package and the fact that the belt package is at least in part exposed between the closure elements, the fire protection collar eliminates the need for complex molded parts for which the manufacturer would need to keep expensive punching or bending tools available. In addition, the fact that the closure elements are arranged at the ends of the belt package allows for inexpensive adaptability of production with respect to different pipe diameters also being provided, since only the package length of the belt package needs to be adjusted if necessary. However, the closure elements do not need to be modified. Furthermore, the belt package does not need to be positioned in a complicated manner in a receiving space of a collar element.

Because the manufacturer can thus produce the fire protection collar with relatively little effort, even for different pipe diameters, there is no need for the installer or user to perform any on-site adjustment with regard to the pipe diameter, with the exception of adjusting the package length. Furthermore, it is advantageous for the installer that the closure elements can also be fastened to one another so that the fire protection collar forms the closed contour and can be placed around the pipe and arranged circumferentially. This simplifies installation. Both the production and the installation effort are therefore low.

Preferably, the belt package has a plurality of separate belts arranged in parallel along the package length. For this reason, in the context of the present application, a belt package is to be understood as a parallel arrangement of at least two layers, generally also of a plurality of layers. In particular, the belt package can have between two and eight, preferably between four and seven, generally separate belts. The number of layers of the belts of the belt package generally depends on the diameter of the pipe and thus on the size of the wall or ceiling opening.

The belts are generally understood to be separate strip-shaped components. In the present case, the strip-shaped components at least in part comprise the intumescent material. The strip-shaped components are arranged substantially parallel (stacked) with respect to one another along their longitudinal extension direction and width and typically have the same strip widths perpendicular to the longitudinal extension direction. Alternatively or cumulatively, the strip thicknesses of the strip-shaped components are also the same.

Optionally, the belts of the belt package have different belt lengths along their longitudinal extension direction. After installation, the longitudinal extension direction is oriented parallel to the circumference of the pipe.

In the present case, the closure elements have closure sections such that they can be fastened to one another by means of at least one positive connection. This ensures after installation a closed contour of the fire protection collar around the pipe. In particular, the connection can additionally or alternatively also be frictional. Furthermore, the connection can also be non-positive. In addition or alternatively, securing components causing a spring force can also be provided in order to prevent any loosening of the fastening.

In the present case, the package length is understood to mean that length of a belt of the plurality of belts of the belt package that is at a maximum with respect to the different belts.

Optionally, the respective closure element at least in part borders the belt package at the respective end. Because the belt package comprises a plurality of belts, this means that each closure element borders at least one belt of the belt package. In the present case, it is understood that the closure element is fixed to the respectively bordered belt, for example by means of a clamping connection or a hook connection. Optionally, each closure element can also border a plurality of generally separate belts of the belt package.

In a particular embodiment, first belt ends of the belts of the belt package defining the package length are arranged flush with one another at the first end of the belt package, and second belt ends of the belts of the belt package defining the package length and opposite the first belt ends are arranged, likewise flush with one another, at the second end of the belt package.

Optionally, each closure element borders all the generally separate belts of the belt package at the respective end. This allows for a particularly robust design of the fire protection collar.

In an alternative embodiment, first belt ends of the belts of the belt package defining the package length are arranged flush with one another at the first end of the belt package, and the second belt ends are arranged offset from one another along the package length at the second end of the belt package.

Optionally, one closure element borders all the generally separate belts of the belt package at the first end. In contrast, in this embodiment, the complementary closure element borders only a reduced number of the belts, in particular only one belt, of the belt package. In this embodiment, the fire protection collar has increased flexibility because at least some of the belts of the belt package are fastened only at one end. This can be advantageous in complex and difficult installation situations. In general, the two closure elements border the belt of the belt package, which, after installation, is arranged on the outside with respect to the radial distance from the pipe around which the fire protection collar is arranged. However, this means that in the event of a fire, the outer belt of the belt package must absorb all the intumescent forces of all belts of the belt package. In this respect, the outer belt must have a suitable load-bearing capacity to force the intumescent material, which expands in the event of fire, along the radial direction towards the center of the fire protection collar so that the wall or ceiling opening provided for the pipe can be closed off. For this reason, in this embodiment, at least the outer belt of the belt package can comprise a correspondingly formed carrier layer that provides sufficient strength. In general, of course, all the belts of the belt package can comprise such a carrier layer, thus avoiding the production of different belt types of the belt package.

Optionally or cumulatively, each closure element has at least one fastening device by means of which the fire protection collar can be fastened to an external receptacle. In particular, the fastening device can be configured so that the fire protection collar can be mounted on the wall, ceiling or floor having the wall or ceiling opening for the pipe to be sealed in the event of a fire.

Preferably, the fastening device can have at least one eyelet, an elongated hole or a corresponding section, by means of which the respective closure element can be fastened to the external receptacle and which provides at least one degree of freedom with respect to positioning.

The fire protection collar can optionally have at least one mounting device that at least in part borders and receives the belt package between the first end and the second end. The mounting device can be regarded as an additional stabilization device by means of which the generally separate belts of the belt package are coupled to one another at points in the region of the mounting device. Although the belts of the belt package are generally separate, an advantageous unit is thereby formed so that handling is simplified.

Optionally, the mounting device is can be displaced along the package length. As a result, the positioning of the mounting device as needed can be ensured particularly advantageously along the package length.

Alternatively or cumulatively, the mounting device has at least one additional fastening device by means of which the fire protection collar can be fastened to the external receptacle. The mounting device can therefore also contribute to the fastening of the fire protection collar. Particularly advantageously, the fastening is ensured by the displaceable mounting device at different relative positions along the package length of the belt package.

Optionally, a plastic layer, in particular a foam layer, is arranged adjacent to the belt package along the package length. The plastic layer is thus arranged in a planar manner (stacked) parallel to the belt package. When the fire protection collar is mounted, the plastic layer can be arranged on the inside in relation to the belt package, in particular along the radial direction with respect to the center of the fire protection collar. This reduces the internal diameter of the fire protection collar. The plastic layer can then act as a buffer layer with respect to the pipe around which the fire protection collar is mounted. With suitable material selection, the plastic layer creates frictional forces, such that the fire protection collar is held more easily in position during the mounting process. The plastic layer can have a corresponding thickness for this purpose. In addition, the plastic layer can be at least in part compressible in order to allow advantageous positioning during the installation situation.

In a preferred embodiment, the package length of the belt package is dimensioned such that a circumferential gap is provided between the pipe around which the fire protection collar is arranged and the fire protection collar itself in the radial direction. In order to provide the gap, a length of the closure elements can be taken into account.

Preferably, the package length of the belt package is matched to the pipe diameter to provide a gap along the radial direction. The gap width and thus also the package length of the belt package can depend in particular on the diameter of the pipe.

For example, a circumferential distance between the pipe and the fire protection collar can be one centimeter. The distance can generally be used to prevent good thermal contact between the pipe and the fire protection collar. In addition, the fire protection collar is generally fastened to the wall, but the pipe can have a certain clearance with respect to the respective opening. The distance thus also serves to prevent damage to the components due to relative movements. In this embodiment, an at least in part compressible plastic layer having a thickness of 1.5 cm can then optionally be provided. Because the thickness of the plastic layer is greater than the nominal distance between the pipe and the fire protection collar in the installed state, the plastic layer provides a frictional connection with respect to the pipe, in particular if the plastic layer comprises foam. This makes it easier to position the fire collar during installation. Preferably, at least the closure elements, but in particular also the mounting device, comprise a metal. This prevents these components from melting prematurely in the event of a fire.

Optionally, the closure elements can be fastened to the belt package by means of locking devices. The locking devices can in particular comprise hooks, clamps, screws, rivets, adhesives and similar connection components. This ensures positional accuracy of the closure elements with respect to the belt package.

Preferably, the belts have a carrier layer for the intumescent material. This means that the belts can in each case be at least double-layered. In this case, the carrier layer can provide sufficient structural stability to force the intumescent material along the radial direction towards the center of the fire protection collar when it expands in the event of a fire. The second layer can essentially comprise the intumescent material. Advantageously, the carrier layer of each belt of the belt package is arranged radially outwardly relative to the layer of the intumescent material in the installation situation.

All of the features explained with respect to the various aspects can be combined individually or in (sub)combination with other aspects.

Figure 2:
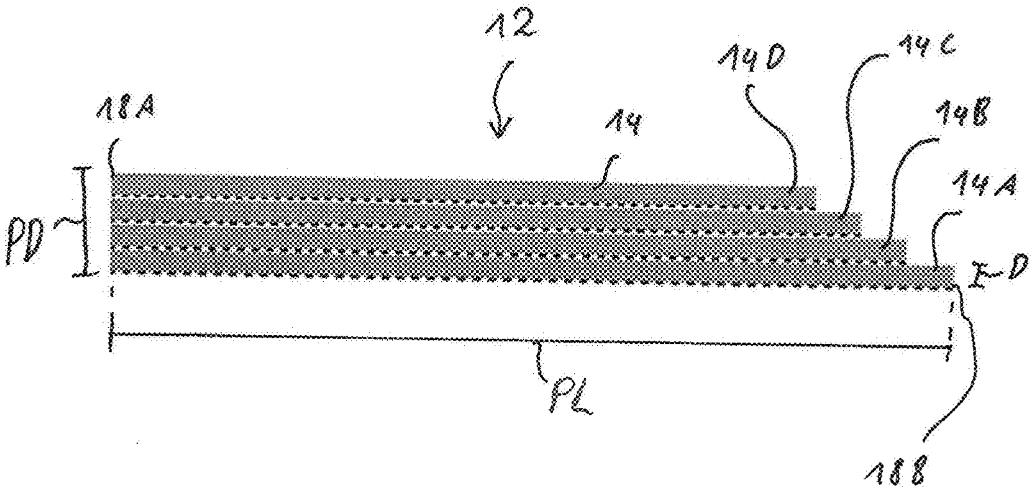
FIG. 2 is a simplified schematic representation of a belt package.
Figure 3:
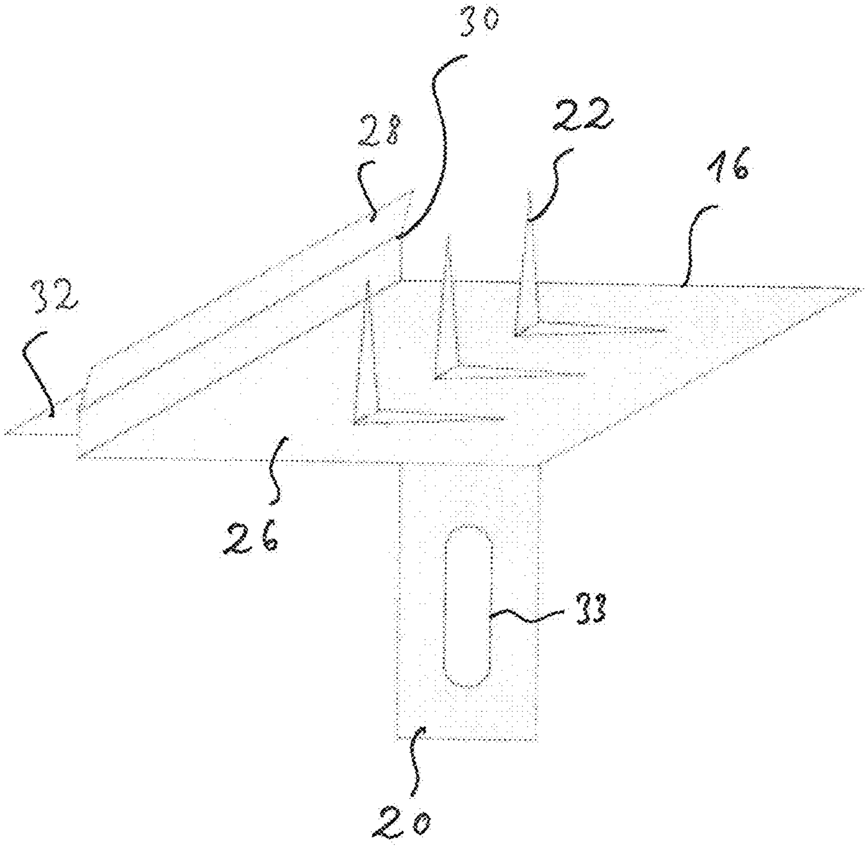
FIG. 3 is a simplified schematic representation of a closure element.
Figure 4:
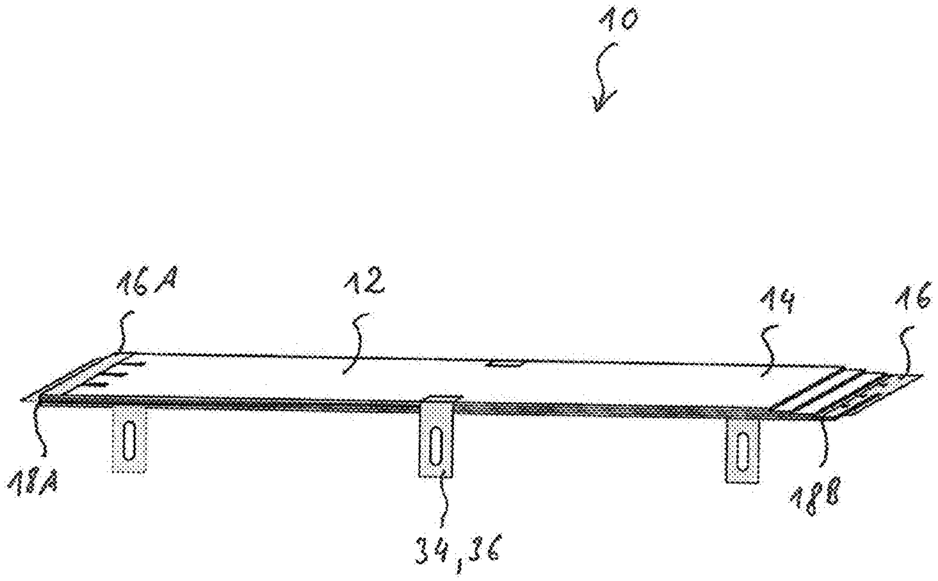
FIG. 4 is a simplified schematic representation of a fire protection collar according to a further embodiment.
Figure 5:
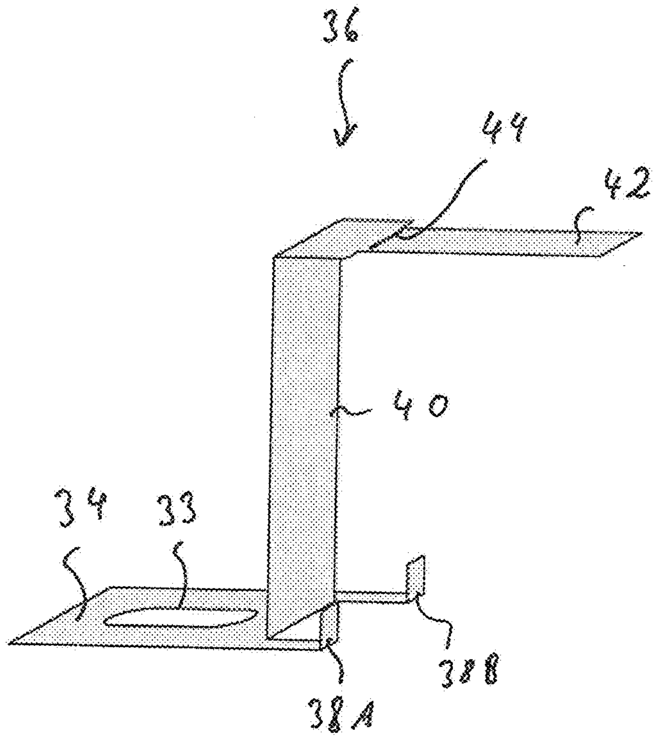
FIG. 5 is a simplified schematic representation of a mounting device.
Figure 6:
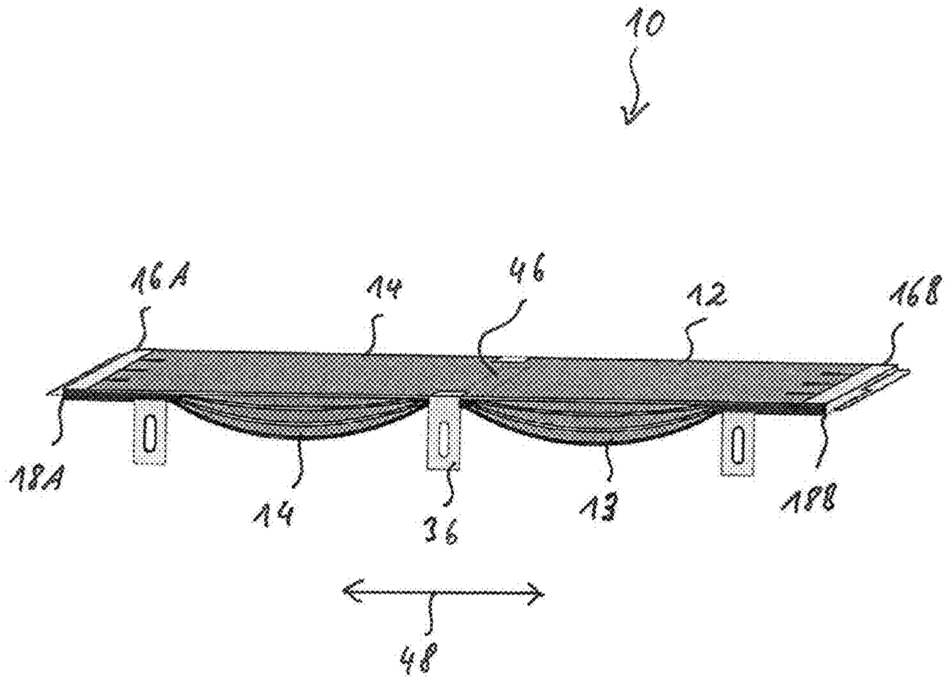
FIG. 6 is a simplified schematic representation of a fire protection collar according to a further embodiment.
Figure 7:
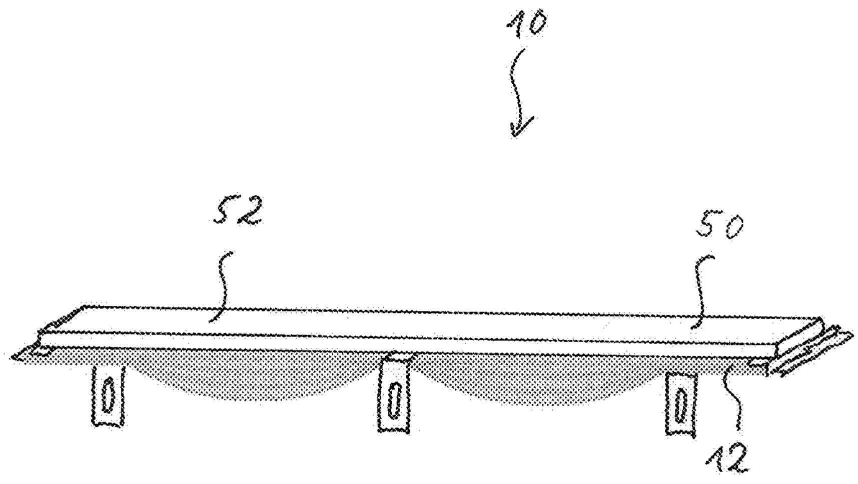
FIG. 7 is a simplified schematic representation of a fire protection collar according to a further embodiment.

The invention and further advantageous embodiments and developments thereof are described and explained in more detail below with reference to the examples shown in the drawing. The features found in the description and the drawing can be applied individually or together in any combination according to the invention. In the drawings:

FIG. 1 is a simplified schematic representation of a fire protection collar according to one embodiment, FIG. 2 is a simplified schematic representation of a belt package, FIG. 3 is a simplified schematic representation of a closure element, FIG. 4 is a simplified schematic representation of a fire protection collar according to a further embodiment, FIG. 5 is a simplified schematic representation of a mounting device, FIG. 6 is a simplified schematic representation of a fire protection collar according to a further embodiment, and FIG. 7 is a simplified schematic representation of a fire protection collar according to a further embodiment.

All features disclosed below with respect to the exemplary embodiments and/or accompanying figures can be combined, separately or in any sub-combination, with features of the aspects of the present disclosure, including features of preferred embodiments, provided that the resulting feature combination is useful to a person skilled in the art in the field of technology.

FIG. 1 is a simplified schematic representation of a fire protection collar 10 according to one embodiment. The fire protection collar 10 comprises a belt package 12, which in turn has a plurality of belts 14. The belts 14 are generally arranged parallel to one another along the longitudinal extension direction of the belt package 12. In particular, the belts 14 along the package length PL and the belt package width PB are generally arranged flat with respect to one another, i.e., stacked, corresponding to their own width B.

The belt package 12 has a package thickness PD. Along the package thickness PD, the belts 14 of the belt package 12 are arranged parallel to one another.

The belts 14 are arranged substantially loosely with respect to one another in relation to the respectively opposite surfaces along the longitudinal extension direction of the belt package 12, i.e., without direct coupling to one another, so that intermediate spaces 13 are formed between the belts 14.

The reason for the intermediate spaces 13 is the necessarily different belt lengths of the separate belts 14. When the fire protection collar 10 is arranged around the pipe, different belt lengths are required with respect to the parallel belts 14 due to the different radial distances from the center of the fire protection collar 10 so that the belts 14 are arranged adjacent to one another in the installation situation without intermediate spaces 13. The intermediate spaces 13 are therefore only present in the artificial, planar extension of the fire protection collar 10, which does not correspond to the installation situation, at least when the belts 14 of the belt package 12 are flush with one another at the ends 18A, 18B.

The belts 14 of the belt package 12 are at least in part exposed between the first end 18A and the second end 18B. This means that the belts 14 are at least in part unsupported. They are therefore not bordered by further components at least in part along the package length PL.

The fire protection collar 10 comprises a first closure element 16A and a second closure element 16B. The first closure element 16A is arranged at the first end 18A of the belt package 12. The second closure element 16B is arranged at the second end 18B of the belt package 12. With respect to the longitudinal extension direction of the belt package 12, the first end 18A and the second end 18B are arranged opposite one another.

The respective closure elements 16A, 16B comprise fastening devices 20 by means of which the closure elements 16A, 16B can be fastened to an external receptacle.

Furthermore, the closure elements 16A, 16B have locking devices 22, by means of which they can be fastened to the belt package 12.

The coordinate system 24 schematically illustrates the orientation of the length L, width B and thickness D both with respect to the belts 14 and with respect to the belt package 12.

FIG. 2 is a simplified schematic representation of a belt package 12. In the present case, the belt package 12 comprises four belts 14A to 14D arranged in parallel. According to this embodiment, the individual belts 14A to 14D have different belt lengths. The belt package length PL of the belt package 12 is determined by the length L of the belt 14A whose length L is the maximum.

The belts 14A to 14D are arranged flush with one another at the first end 18A of the belt package 12. Due to the different belt lengths of the belts 14A to 14B, the ends of the belts 14A to 14D are arranged offset from each other at the opposite second end 18B of the belt package 12, specifically along the longitudinal extension direction of the belt package 12.

In general, the belts 14A to 14D have at least a double-layered structure. A first layer of a belt acts as a carrier layer, whereas the second layer at least in part has an intumescent material.

FIG. 3 is a simplified schematic representation of a closure element 16. In the present case, the closure element 16 has locking devices 22 designed as hooks. In the installation situation, the locking devices 22 can extend at least in part through the belt package 12. The belt package 12 then rests on the support surface 26. The end 18 of the belt package 12 rests at least in part flush against the abutment surface 30. According to this embodiment, the locking devices 22 can then be bent in the direction of the abutment surface 30 and be covered by a cover section 28 that is also bendable, such that the risk of injury is minimized. The belt package 12 is then bordered by the closure element 16 by the interaction of the cover portion 28 and the contact surface 26 by means of the locking devices 22.

In the event of a fire, the locking devices 22 and the cover portion 28 can advantageously bend back (bend open). This ensures that, in the event of a fire, these components can be pushed back by the intumescence in order to give the expansion of the fire protection collar 10 more room.

The closure element 16 further comprises a closure portion 32 that can interact with a corresponding closure portion 32 of a further closure element 16. In particular, the closure portions 32 can interact in such a way that an at least positive fastening of the closure elements 16 to one another is ensured, as a result of which a closed contour of the fire protection collar 10 is ensured. The closure sections 32 therefore ensure a simple installation option for the fire protection collar 10, as they can be opened in order to provide the possibility of positioning the fire protection collar 10 around the pipe. The closure sections 32 can then interact and ensure fastening of the fire protection collar 10 with respect to the pipe.

In the present case, the fastening device 20 comprises an elongated hole 33 to simplify the positioning of the closure element 16 on the external receptacle.

In general, the closure element 16 is made of a metal material.

In the present case, the closure element 16 does not have a complex geometry, so that expensive punching and bending tools can be avoided during production. In particular, the closure element 16 is also suitable for different fire protection collars 10 depending on the respective pipe diameter. For this reason, only one type of closure element 16 needs to be produced. The closure element 16 is universal for any pipe size.

FIG. 4 is a simplified schematic representation of a fire protection collar 12 according to a further embodiment. Only differences from the preceding embodiment will be discussed here.

The first closure element 16A is arranged at a first end 18A of the belt package 12, the belts 14 of which are arranged flush with one another at this first end 18A.

In contrast, the second closure element 16B is arranged at the second end 18B of the belt package 12, the belts 14 of which terminate at this second end 18B offset from one another.

This arrangement enables intermediate spaces 13 to be avoided. Nevertheless, the different belt lengths of the belts 14 of the belt package 12 cause no additional gaps to arise in the installation situation of the fire protection collar 10. The offset between the belts 14 along the longitudinal extension direction of the belt package 12 in the region of the second end 18B of the belt package 12 is selected such that it corresponds to the respective length difference between adjacent belts 14 caused in the installation situation by the different radial distances from the center of the fire protection collar 10.

The present configuration has advantages with respect to storability, because the space required along the package thickness PD is reduced in relation to belts 14 of the belt package 12 arranged flush on both sides at the opposite ends 18A, 18B. The storage space required is therefore reduced.

In the present case, the fire protection collar 10 additionally has a further fastening device 34 that is provided by a mounting device 36. The mounting device 36 provides additional coupling of the belts 14 of the belt package 12 between the first end 18A and the second end 18B.

FIG. 5 is a simplified schematic representation of a mounting device 36. In a known manner, the mounting device 36 has an elongated hole 33 in the region of the fastening device 34, which elongated hole simplifies the positioning of the mounting device 36 on the external receptacle.

Furthermore, the mounting device 36 has two clamping sections 38A, 38B arranged in pairs. In the installation situation, the belt package 12 rests against the contact surface 40 of the mounting device 36 and the clamping sections 38A, 38B engage around the belt package 12. The distance between the clamping sections 38A, 38B and the contact surface 40 therefore corresponds to the package thickness PD. Corresponding to the clamping sections 38A, 38B, the mounting device 36 has a third clamping section 42 that can be bent at a fold line 44 in order to be arranged on the opposite side relative to the contact surface 40 with respect to the then enclosed belt package 12. The belt package 12 is then enclosed by the mounting device 36.

FIG. 6 is a simplified schematic representation of a fire protection collar 10 according to a further embodiment. Only differences from the preceding embodiments are discussed here.

In a coupling region 46 of the belt package 12, the mounting device 36 provides additional coupling of the belts 14 of the belt package to one another. As a result, the mounting of the fire protection collar 10 is simplified, because the intermediate spaces 13 are therefore limited perpendicularly to the longitudinal extension direction and the width of the belt package 12. In general, the mounting device 36 is displaceable along the longitudinal extension direction of the belt package 12, which in the present case is indicated by the arrow 48. Due to the displaceability, the mounting of the fire protection collar 10 is again simplified, as the mounting device 36 can be positioned as required. Of course, the fire protection collar 10 can also have additional mounting devices 36.

FIG. 7 is a simplified schematic representation of a fire protection collar 10 according to a further embodiment. Only differences from the preceding embodiment are discussed here.

The fire protection collar 10 now additionally has a plastic layer 50. The plastic layer 50 comprises a foam 52 and, depending on the installation situation, is arranged along the radial direction of the fire protection collar 10 on the inside relative to the belt package 12 and parallel thereto.

The foam 52 of the plastic layer 50 is compressible and can cause frictional forces with respect to the pipe around which the fire protection collar 10 is to be installed. The frictional forces prevent the fire protection collar 10 from unwantedly sliding along the pipe before the fire protection collar 10 is fastened to an external receptacle, for example by means of fastening devices 20, 34. This simplifies mounting.

The present disclosure may refer to amounts and numbers. Unless expressly stated, such amounts and numbers are not to be considered as limiting, but as examples of the possible amounts or numbers in connection with the present disclosure. In this context, the term "plurality" may also be used in the present disclosure to refer to an amount or number. In this context, the term "plurality" refers to any number that is greater than one, for example, two, three, four, five, etc. The terms "about," "approximately," "close to" etc. mean plus or minus 5% of the given value.

The invention claimed is:

1. A fire protection collar for a pipe, the fire protection collar comprising:

a belt package at least in part comprising an intumescent material, a first closure element, and a second closure element, wherein the first closure element is arranged at a first end of the belt package, the second closure element is arranged at a second end of the belt package opposite the first end, wherein the first closure element and the second closure element are configured to fasten together in such a way that the belt package forms a substantially closed contour, the belt package has a package length between the first end and the second end of the belt package and is exposed at least in part along the package length; and said belt package comprises a plurality of separate belts arranged in parallel along the package length wherein an outer belt has a suitable load-bearing capacity to force expansion towards the center of the collar.

2. The fire protection collar according to claim 1, wherein a respective closure element at least in part borders the belt package at a respective end.

3. The fire protection collar according to claim 1, wherein each closure element has at least one fastening device, by which the fire protection collar is configured to fasten to an external receptacle.

4. The fire protection collar according to claim 1, wherein the separate belts have different belt lengths.

5. The fire protection collar according to claim 1, wherein the first belt ends of the belts defining the package length are arranged flush with one another at the first end of the belt package, and the second belt ends of the belts defining the package length and opposite the first belt ends are likewise arranged flush with one another at the second end of the belt package, or the second belt ends at the second end of the belt package are arranged offset relative to one another along the package length.

6. The fire protection collar according to claim 1, further comprising:

at least one mounting device that at least in part surrounds and receives the belt package between the first end and the second end.

7. The fire protection collar according to claim 6, wherein the mounting device is configured to displace along the package length.

8. The fire protection collar according to claim 6, wherein the mounting device has at least one additional fastening device, by which the fire protection collar is configured to fasten to the external receptacle.

9. The fire protection collar according to claim 1, wherein a plastic layer is arranged adjacent to the belt package of the package length.

10. The fire protection collar according to claim 1, wherein said outer belt comprises a carrier layer.

11. The fire protection collar according to claim 9, wherein said plastic layer is a foam layer.

12. The fire protection collar according to claim 1, wherein a plastic layer has a thickness and which is at least in-part compressible.

* * * * *